United States Patent
Watanabe et al.

(10) Patent No.: US 10,476,097 B2
(45) Date of Patent: Nov. 12, 2019

(54) METHOD OF MANUFACTURING SECONDARY BATTERY AND APPARATUS FOR THE SAME

(71) Applicant: NEC ENERGY DEVICES, LTD., Sagamihara-shi, Kanagawa (JP)

(72) Inventors: Kenji Watanabe, Kanagawa (JP); Hideaki Sasaki, Kanagawa (JP)

(73) Assignee: Envision AESC Energy Devices Ltd., Sagamihara-shi, Kanagawa (JP)

(*) Notice: Subject to any disclaimer, the term of this patent is extended or adjusted under 35 U.S.C. 154(b) by 82 days.

(21) Appl. No.: 15/566,064

(22) PCT Filed: Mar. 29, 2016

(86) PCT No.: PCT/JP2016/060143
§ 371 (c)(1),
(2) Date: Oct. 12, 2017

(87) PCT Pub. No.: WO2016/167116
PCT Pub. Date: Oct. 20, 2016

(65) Prior Publication Data
US 2018/0131029 A1    May 10, 2018

(30) Foreign Application Priority Data
Apr. 16, 2015 (JP) ................................. 2015-084219

(51) Int. Cl.
*H01M 10/04* (2006.01)
*H01M 10/0566* (2010.01)
(Continued)

(52) U.S. Cl.
CPC ..... *H01M 10/0404* (2013.01); *H01M 2/0207* (2013.01); *H01M 2/0217* (2013.01);
(Continued)

(58) Field of Classification Search
CPC ................................. H01M 2/36; H01M 2/361
See application file for complete search history.

(56) References Cited

U.S. PATENT DOCUMENTS

| | | | | |
|---|---|---|---|---|
| 6,095,206 A * | 8/2000 | Jones | ........................ | B65B 3/32 |
| | | | | 137/428 |
| 6,248,138 B1 * | 6/2001 | Lafave | .................... | H01M 2/06 |
| | | | | 29/623.1 |

(Continued)

FOREIGN PATENT DOCUMENTS

| JP | 7-118307 B2 | 3/1990 |
| JP | 2004-022208 A | 1/2004 |

(Continued)

OTHER PUBLICATIONS

International Search Report for PCT/JP2016/060143 dated Jun. 7, 2016 [PCT/ISA/210].

(Continued)

*Primary Examiner* — Matthew J Merkling
(74) *Attorney, Agent, or Firm* — Sughrue Mion, PLLC

(57) ABSTRACT

The present invention has an object to provide a secondary battery manufacturing method and apparatus capable of impregnating a sufficient amount of electrolyte in an electrode laminated body with simplified work effort while reducing working time and a manufacturing cost. The method of manufacturing a secondary battery according to the present invention comprises the steps of: inserting, into an outer container, an electrode laminated body in which a positive electrode and a negative electrode are laminated with a separator interposed therebetween; sealing an outer peripheral portion of the outer container except for a part thereof before or after the electrode laminated body is inserted; and injecting electrolyte (5) into the outer container having the electrode laminated body inserted therein, from non-sealed part as an injection port (6*a*). In the step of (Continued)

injecting the electrolyte (5), injection of the electrolyte (5) is started in an atmospheric pressure environment, and then the injection of the electrolyte (5) and pressure reduction of an environmental pressure are performed.

4 Claims, 12 Drawing Sheets

(51) Int. Cl.
 *H01M 2/02* (2006.01)
 *H01M 2/36* (2006.01)
 *H01M 10/052* (2010.01)
 *H01M 10/0585* (2010.01)

(52) U.S. Cl.
 CPC ......... *H01M 2/0275* (2013.01); *H01M 2/361* (2013.01); *H01M 10/044* (2013.01); *H01M 10/049* (2013.01); *H01M 10/052* (2013.01); *H01M 10/0566* (2013.01); *H01M 10/0585* (2013.01)

(56) References Cited

U.S. PATENT DOCUMENTS

| | | | | |
|---|---|---|---|---|
| 6,497,976 | B1 * | 12/2002 | Morizane | H01M 2/361 141/59 |
| 9,065,131 | B2 * | 6/2015 | Takada | H01M 2/361 |
| 2002/0022180 | A1 * | 2/2002 | Olsen | H01M 2/0212 429/176 |
| 2004/0103526 | A1 * | 6/2004 | Erhardt | H01G 9/08 29/623.1 |
| 2015/0162594 | A1 * | 6/2015 | Watanabe | H01M 2/362 141/1.1 |

FOREIGN PATENT DOCUMENTS

| | | | |
|---|---|---|---|
| JP | 2004-241222 | A | 8/2004 |
| JP | 2005-285646 | A | 10/2005 |
| JP | 2008-059973 | A | 3/2008 |
| JP | 2008-171579 | A | 7/2008 |
| JP | 4291194 | B2 | 7/2009 |
| JP | 2010-055950 | A | 3/2010 |
| JP | 2011-154859 | A | 8/2011 |
| JP | 2011-171159 | A | 9/2011 |
| JP | 2013-26172 | A | 2/2013 |
| JP | 2013-105564 | A | 5/2013 |
| JP | 2014-22336 | A | 2/2014 |
| WO | 00/41263 | A1 | 7/2000 |

OTHER PUBLICATIONS

Written Opinion for PCT/JP2016/060143 dated Jun. 7, 2016 [PCT/ISA/237].

\* cited by examiner

METHOD OF MANUFACTURING SECONDARY BATTERY AND APPARATUS FOR THE SAME

CROSS REFERENCE TO RELATED APPLICATIONS

This application is a National Stage of International Application No. PCT/JP2016/060143 filed Mar. 29, 2016, claiming priority based on Japanese Patent Application No. 2015-084219 filed Apr. 16, 2015, the contents of all of which are incorporated herein by reference in their entirety.

TECHNICAL FIELD

The present invention relates to a method of manufacturing a secondary battery and an apparatus for manufacturing the secondary battery.

BACKGROUND ART

Secondary batteries are widely pervasive as power supplies for portable equipment such as a portable telephone, a digital camera, a laptop computer, etc., a power supply for a vehicle and a household power supply. The secondary battery is configured such that a battery element (electrode laminated body) formed by winding or laminating a positive electrode and a negative electrode while the positive electrode and the negative electrode are spaced from each other across a separator is contained and enclosed together with electrolyte in an outer container. In the secondary battery, a sufficient amount of electrolyte must be impregnated into cavity portions of the electrode laminated body inside the outer container. When the amount of impregnated electrolyte is small, a coating on the surface of the electrode becomes non-uniform, resulting in generation of a deposit on the surface of the electrode or the like, so that electrochemical characteristics such as a cycle characteristic, etc. are degraded and the desired battery characteristics cannot be obtained.

Patent Document 1 discloses a method of injecting electrolyte into an outer container while a pressure is not particularly changed in an atmospheric pressure environment, and, after the injection of the electrolyte, reducing a pressure in the outer container to a pressure which is lower than the atmospheric pressure, but is equal to or higher than the vapor pressure of the electrolyte, thereafter sealing an injection port (opening portion) of the outer container.

Patent Document 2 discloses a method of injecting electrolyte into an outer container housing an electrode laminated body therein in an environment which is almost vacuum due to pressure reduction, and after the injection of the electrolyte, pressurizing an inside of the outer container to impregnate the electrolyte into the electrode laminated body.

Patent Document 3 discloses a method of starting injection of electrolyte into an outer container under a negative pressure environment of about 10 kPa (a pressure of about one tenth of the atmospheric pressure) achieved by reducing pressure from the atmospheric pressure, and completing the injection of the electrolyte before or at the time when nearly a state of vacuum is reached by continuing the pressure reduction.

PRIOR ART DOCUMENTS

Patent Documents

Patent Document 1: International Publication No. WO00/041263
Patent Document 2: JP4291194B
Patent Document 3: JP2014-22336A

SUMMARY OF INVENTION

Problem to be Solved by Invention

It is difficult for all the methods disclosed in Patent Documents 1 to 3 to impregnate a sufficient amount of electrolyte particularly when electrolyte with a high viscosity is used. Even when the electrode laminated body is pressurized after injection of the electrolyte so that the electrolyte is impregnated into cavities inside the electrode laminated body by using the capillary phenomenon, a non-impregnated portion which has not been impregnated with the electrolyte and which still remains in the electrode laminated body is relatively large, so that desired battery characteristics may not be realized. When the pressurizing step of the electrode laminated body as described above and the pressure reducing step for infiltrating the electrolyte into the electrode laminated body are executed a plurality of times, the amount of the impregnated electrolyte is increased somewhat, but it does not reach a sufficient impregnation amount. In addition, the work becomes complicated, resulting in a significant increase of a working time and manufacturing cost.

Therefore, an object of the present invention is to solve the foregoing problems, and provide a secondary battery manufacturing method and apparatus capable of impregnating a sufficient amount of electrolyte in an electrode laminated body with simplified work effort while reducing working time and a manufacturing cost.

Means to Solve the Problem

A method of manufacturing a secondary battery according to the present invention, the method comprises the steps of: inserting, into an outer container, an electrode laminated body in which a positive electrode and a negative electrode are laminated with a separator interposed therebetween; sealing an outer peripheral portion of the outer container except for a part thereof before or after the electrode laminated body is inserted; and injecting electrolyte into the outer container having the electrode laminated body inserted therein, from non-sealed part as an injection port. In the step of injecting the electrolyte, injection of the electrolyte is started in an atmospheric pressure environment, and then the injection of the electrolyte and pressure reduction of an environmental pressure are performed.

An apparatus for manufacturing a secondary battery according to the present invention, the apparatus comprises: a chamber that houses an outer container in which an electrode laminated body including a positive electrode and a negative electrode laminated with a separator interposed therebetween is inserted, an outer peripheral portion of the outer container being sealed except for a part thereof; an electrolyte injecting device that injects electrolyte into the outer container inside the chamber; a pressure adjusting device that adjusts an environmental pressure in the chamber; and a control device that controls the electrolyte injecting device and the pressure adjusting device such that injection of the electrolyte into the outer container is started in a state where an inside of the chamber is in an atmospheric pressure environment, and then the environmental pressure in the chamber is reduced in parallel to the injection of the electrolyte into the outer container.

Advantageous Effect of Invention

According to the present invention, it is possible to impregnate a sufficient amount of electrolyte in an electrode laminated body with a simplified work effort while reducing working time and a manufacturing cost.

BRIEF DESCRIPTION OF DRAWINGS

FIG. 1b is a cross-sectional view of an A-A line of FIG. 1a.

DESCRIPTION OF EXEMPLARY EMBODIMENTS

Exemplary embodiments will be described hereunder with reference to the drawings.

[Basic Configuration of Secondary Battery]

Figure 1A:
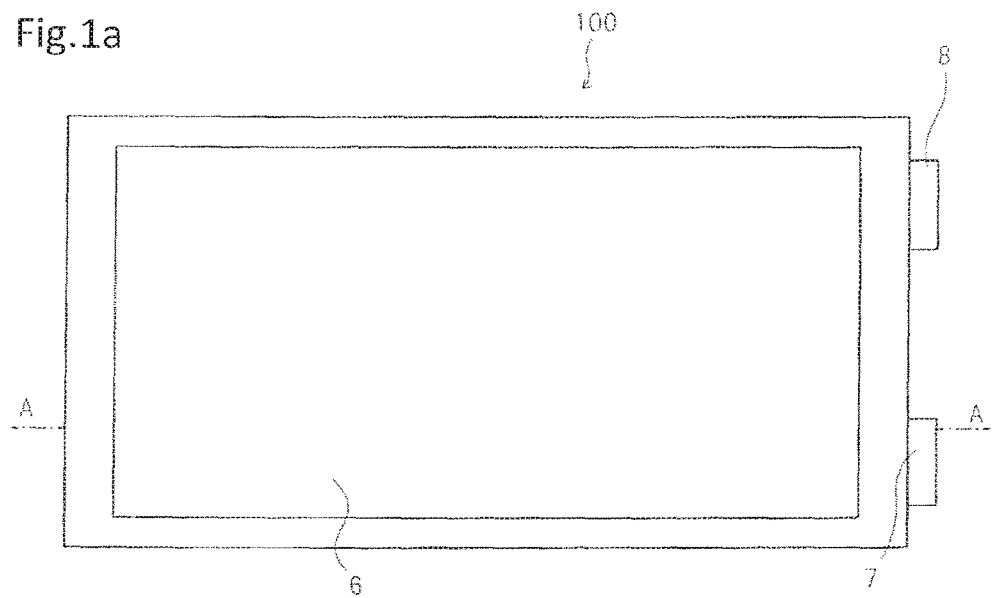
FIG. 1a is a plan view showing an example of a secondary battery manufactured by the present invention.
Figure 1B:
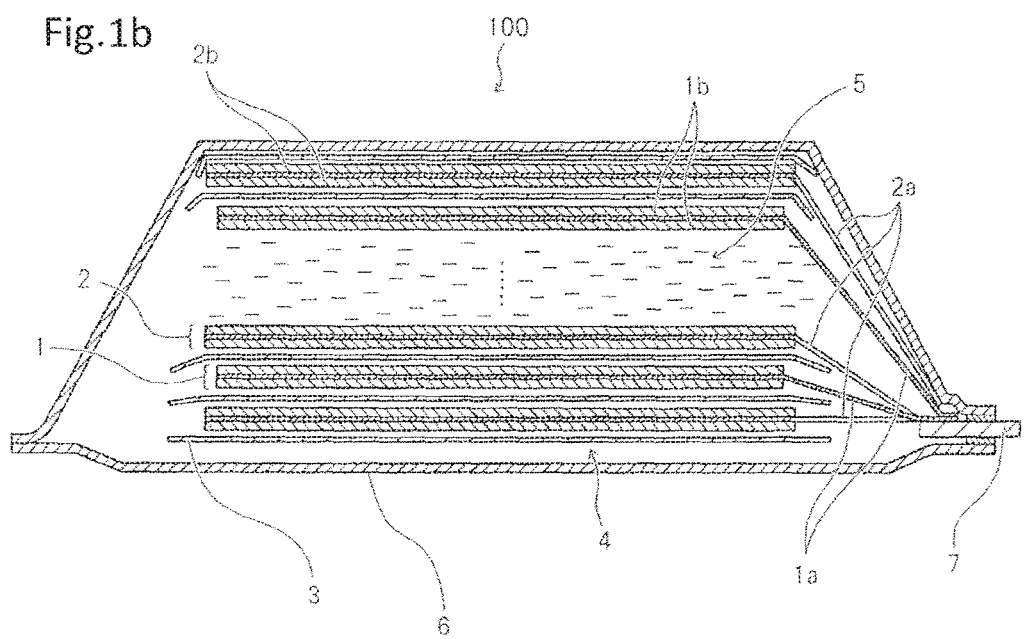

FIGS. 1a to 1b show an example of a laminated-type secondary battery manufactured by the present invention. Secondary battery 100 according to the present invention includes a battery element (electrode laminated body) 4 in which positive electrodes (positive electrode sheets) 1 and negative electrodes (negative electrode sheets) 2 are alternately layered and laminated with separator 3 interposed therebetween. Electrode laminated body 4 is housed together with electrolyte 5 in an outer container 6 made of a flexible film. One end of positive electrode terminal 7 is connected to the positive electrodes 1 of electrode laminated body 4, and one end of negative electrode terminal 8 is connected to negative electrodes 2. The other end side of positive electrode terminal 7 and the other end side of negative electrode terminal 8 are respectively drawn out to the outside of outer container 6. In FIG. 1b, parts of the respective layers (layers located at an intermediate portion in the thickness direction) configuring electrode laminated body 4 are omitted from illustration, and electrolyte 5 is illustrated there.

Positive electrode 1 includes positive electrode current collector 1a, and positive electrode active material layers 1b formed on both the surfaces of positive electrode current collector 1a. Negative electrode 2 includes negative electrode current collector 2a, and negative electrode active material layers 2b formed on both the surfaces of negative electrode current collector 2a. Respective one end portions of positive electrode terminal 7 and negative electrode terminal 8 are connected to uncoated portions on which active material layers 1b and 2b are not formed, of positive electrode current collector 1a and negative electrode current collector 2a.

In secondary battery 100, as the material of positive electrode active material layer 1b, for example, spinel-based materials such as $LiMn_2O_4$, $LiMn_{1.5}Ni_{0.5}O_4$, $LiMn_{(2-x)}M_xO_4$ (here, M represents transition metal, and includes Ni, Co, Fe, Cr and the like as examples), layered oxide-based materials such as $LiCoO_2$, $LiNiO_2$, $LiNi_{(1-x)}CoO_2$, $LiNi_x(CoAl)_{(1-x)}O_2$, $Li_2MnO_3$—$LiMO_2$, and $LiNi_xCo_yMn_{(1-x-y)}O_2$, olivine materials such as $LiMPO_4$, fluorinated olivine-based materials such as $Li_2MPO_4F$ and $Li_2MSiO_4F$, vanadium oxide-based materials such as $V_2O_5$, and the like, can be used.

As the material of negative active material layer 2b, carbon materials such as graphite, amorphous carbon, diamond-like carbon, fullerene, carbon nanotube and carbon nanohorn, lithium metal materials, alloy materials such as silicon and tin, oxide-based materials such as $Nb_2O_5$ and $TiO_2$, or composites thereof, can be used.

Positive electrode active material layer 1b and negative electrode active material layer 2b may be formed of a mixture of the above-described materials to which binder, conductive auxiliary agent or the like is appropriately added. As the conductive auxiliary agent, one kind or a combination of two or more kinds of carbon black, carbon fiber, graphite and the like may be used. As the binder, polyvinylidene fluoride (PVDF), polytetrafluoroethylene, carboxymethyl cellulose, modified acrylonitrile rubber particles, or the like may be used.

Aluminum, stainless steel, nickel, titanium, an alloy thereof or the like may be used for positive electrode current collector 1a, and aluminum is particularly preferable. Copper, stainless steel, nickel, titanium, or an alloy thereof can be used for negative electrode current collector 2a.

As electrolyte 5, one kind or a mixture of two or more kinds of organic solvents such as a cyclic carbonates such as ethylene carbonate, propylene carbonate, vinylene carbonate, butylene carbonate and the like, a chain carbonates such as ethyl methyl carbonate (EMC), diethyl carbonate (DEC), dimethyl carbonate (DMC), dipropyl carbonate (DPC) and the like, aliphatic carboxylic acid ester, γ-lactones such as γ-butyrolactone and the like, chain ether, cyclic ether and the like, may be used. Lithium salt may be dissolved in these organic solvents.

Separator 3 mainly includes a resinous porous film, a woven fabric, a nonwoven fabric or the like, and as a resin component thereof, for example, polyolefin resin such as polypropylene or polyethylene, polyester resin, acrylic resin, styrene resin, nylon resin or the like, may be used. In particular, a polyolefin-based microporous film is preferable because it is excellent in ion permeability and performance for physically isolating positive electrode 1 and negative electrode 2 from each other. Further, if necessary, a layer containing inorganic particles may be formed in separator 3. Insulating oxides, nitrides, sulfides, carbides and the like may be provided as the inorganic particles, and particularly $TiO_2$ or $Al_2O_3$ is preferably contained.

Outer container 6 is made of a flexible film, and a film including a metal layer serving as a base material and resin layers formed on the front and back surfaces of the metal layer may be used as the flexible film. A material having a barrier property in order to prevent leakage of electrolyte 5 and infiltration of water from the outside and the like may be selected as the metal layer, and aluminum, stainless steel or the like may be used. At least one surface of the metal layer is provided with a heat-fusible resin layer such as modified polyolefin or the like. Outer container 6 is formed by arranging the heat-fusible resin layers of the flexible film to be opposite to each other and thermally fusing the periphery of the portion at which electrode laminated body 4 is housed. A resin layer such as a nylon film or a polyester film can be provided on the surface of the outer container which is the surface opposite to the surface on which the heat-fusible resin layer is formed.

Positive electrode terminal 7 may be formed of aluminum or an aluminum alloy. Negative electrode terminal 8 may be formed of copper or copper alloy, or nickel-plated copper or copper alloy, or the like.

[Secondary Battery Manufacturing Apparatus]

Figure 2:
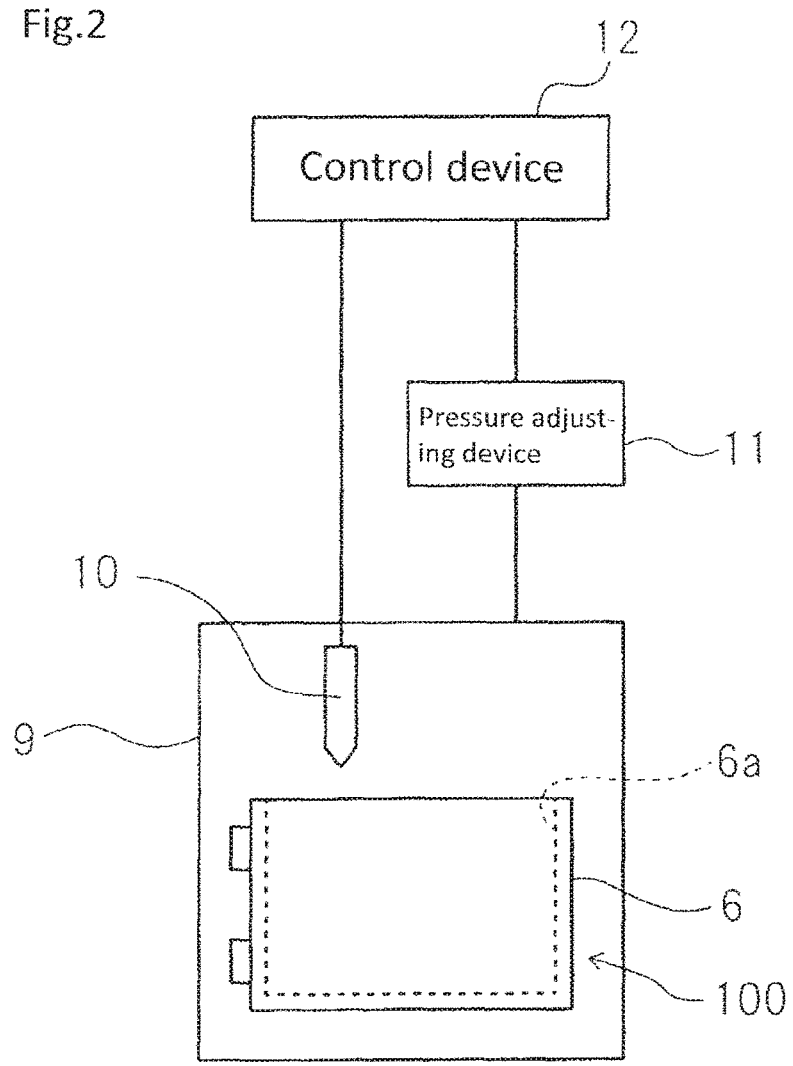
FIG. 2 is a block diagram schematically showing a secondary battery manufacturing apparatus according to a first exemplary embodiment of the present invention.

FIG. 2 shows the basic configuration of a manufacturing apparatus for manufacturing secondary battery 100 as shown in FIGS. 1a to 1b. The secondary battery manufacturing apparatus includes chamber 9 that can house secondary battery 100 therein and can be hermetically sealed, electrolyte injecting device 10 for injecting electrolyte 5 into outer container 6 of secondary battery 100 in chamber 9, pressure adjusting device 11 for adjusting the environmental pressure in chamber 9, and control device 12 for controlling electrolyte injecting device 10 and pressure adjusting device 11. Therefore, the environmental pressure can be increased or decreased by pressure adjusting device 11 while secondary battery 100 is housed in chamber 9. Further, electrolyte 5 can be injected into outer container 6 of secondary battery 100 in chamber 9. Control device 12 controls pressure adjusting device 11 and electrolyte injecting device 10 to determine the electrolyte injection timing and the pressure reduction timing.

[Secondary Battery Manufacturing Method]

A method of manufacturing secondary battery 100 shown in FIGS. 1a to 1b by using the manufacturing apparatus shown in FIG. 2 will be described.

First, the positive electrodes 1 each having positive electrode active material layers 1b formed on both the surfaces of positive electrode current collector 1a, and the negative electrodes each having negative electrode active material layers 2b formed on both of the surfaces of negative current collector 2a are alternately laminated while separator 3 are sandwiched between the positive and negative electrodes, thereby forming electrode laminated body 4. Thus-formed electrode laminated body 4 is inserted in outer container 6. Outer container 6 is made of a bag-shaped flexible film, and the flexile films that overlap at the position corresponding to the outside of the outer peripheral portion of electrode laminated body 4 are joined to each other except for some portions thereof before or after electrode laminated body 4 is inserted, thereby sealing outer container 6. At this time, the portion which is not sealed serves as injection port 6a when electrolyte 5 is injected. Strictly speaking, at the portions where positive electrode terminal 7 and negative electrode terminal 8 are inserted, the overlapped flexible films are not directly joined to each other, but the flexible films are still joined to each other up to a position where they are in close contact with outer edge portions of positive electrode terminal 7 and negative electrode terminal 8, whereby sealing is performed without occurrence of any gap.

Figure 3A:
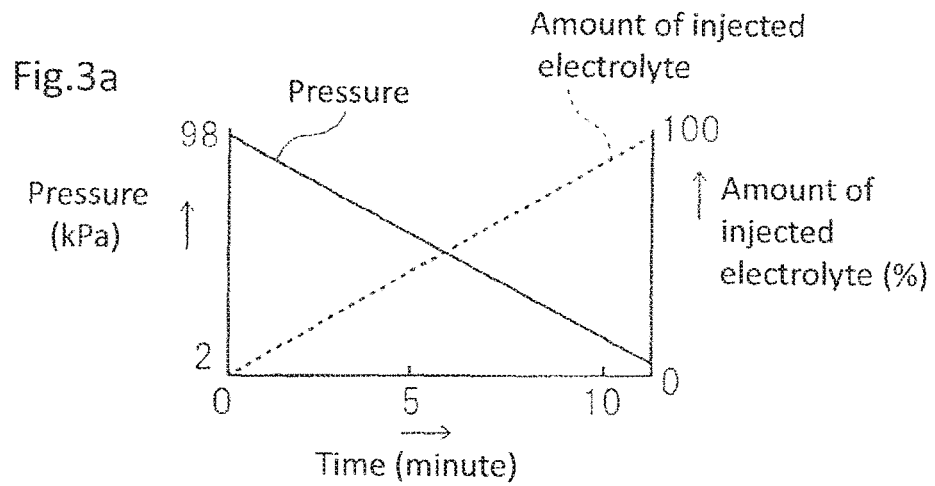
FIG. 3a is a graph schematically showing the relationship between an environmental pressure and an amount of injected electrolyte in a secondary battery manufacturing method according the first exemplary embodiment of the present invention.

Electrolyte 5 is injected while electrode laminated body 4 is inserted in outer container 6 that is sealed except for a part thereof (injection port 6a) as described above. In this exemplary embodiment, outer container 6 is disposed in chamber 9, and control device 12 actuates pressure adjusting device 11 to gradually reduce the pressure in chamber 9 from the atmospheric pressure (for example, 98 kPa) and at the same time, actuates electrolyte injecting device 10 to inject electrolyte 5 from injection port 6a into outer container 6. That is, as shown in FIG. 3a, the injection of electrolyte 5 is started in the atmospheric pressure environment, and electrolyte 5 is infiltrated into outer container 6 while the pressure in chamber 9 (the environmental pressure) is gradually reduced. Finally, the injection of a predetermined amount of electrolyte 5 is completed under the environment in which the pressure drops near the vapor pressure of the electrolyte. In this exemplary embodiment, the pressure at which the pressure reduction is stopped is set to 2 kPa. Thereafter, the non-sealed portion used as injection port 6a is sealed. According to the injection method of electrolyte 5 as described above, the impregnation of electrolyte 5 into electrode laminated body 4 is very favorably performed. Thereafter, the pressure reduction by pressure adjusting device 11 is released to return the pressure in chamber 9 to the atmospheric pressure. Thereafter, outer container 6 may be physically pressurized to promote the impregnation of the electrolyte as required.

[Evaluation]

Figure 3B:
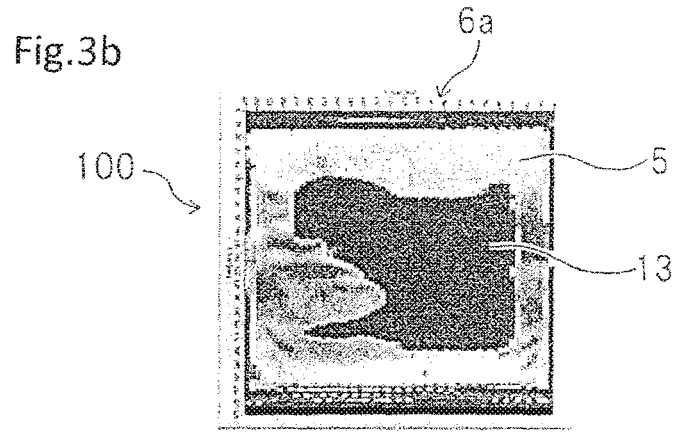
FIG. 3b is a schematic diagram showing an impregnated state at the time point when the injection of the electrolyte is completed in the secondary battery manufacturing method according to the first exemplary embodiment of the present invention.
Figure 3C:
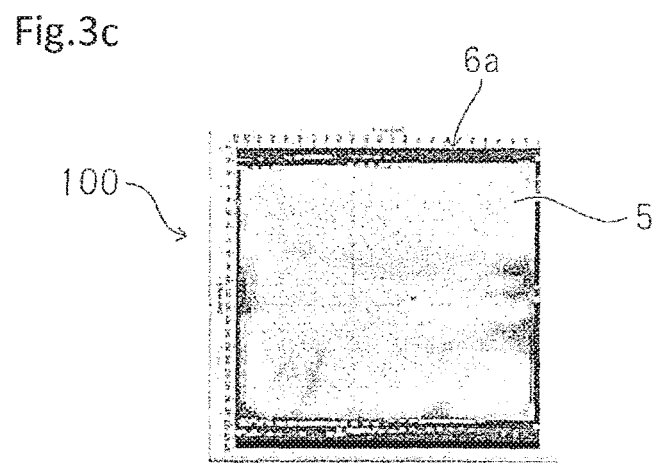
FIG. 3c is a schematic diagram showing an impregnated state after a pressurizing and maintaining step in the secondary battery manufacturing method according to the first exemplary embodiment of the present invention.

The injection method of electrolyte 5 will be evaluated based on actual experimental results. FIG. 3b shows a state where electrolyte 5 is injected according to the exemplary embodiment described above. Light gray color in FIG. 3b represents electrolyte 5, and air 13 looks black. In the state shown in FIG. 3b, electrolyte 5 was impregnated in approximately 62.4% of entire electrode laminated body 4 (the impregnation rate was 62.4%). Further, when electrode laminated body 4 was left for about 18 hours while electrode laminated body 4 was physically pressurized, and the infiltration of electrolyte 5 was promoted by utilizing the capillary phenomenon, as shown in FIG. 3c, about 99.9% of entire electrode laminated body 4 was impregnated with electrolyte 5. That is, substantially complete impregnation of electrolyte 5 was performed. When the same experiment was repeated a plurality of times, the impregnation rate results after the pressurizing and maintaining step were 99.9%, 99.0%, 97.7%, and 98.4%. The impregnation rate is a value expressed in percentage by dividing the area of the portion impregnated with electrolyte 5 by the area of the entire electrode laminated body and then multiplying the division resultant by 100.

Figure 4A:
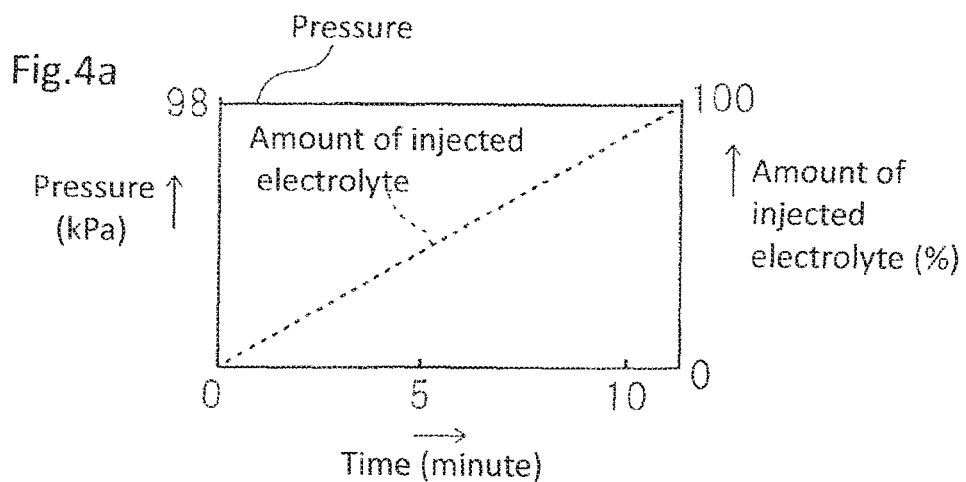
FIG. 4a is a graph showing the relationship between the environmental pressure and the amount of injected electrolyte in Comparative Example 1.
Figure 4B:
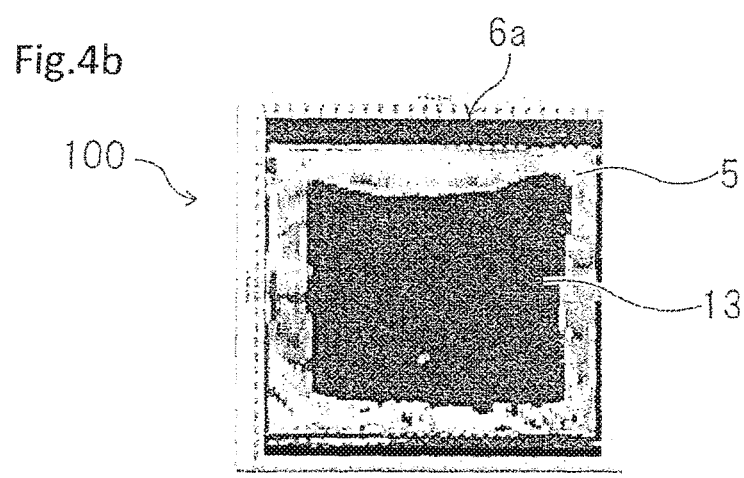
FIG. 4b is a schematic diagram showing an impregnated state at the time point when the injection of the electrolyte is completed in Comparative Example 1.
Figure 4C:
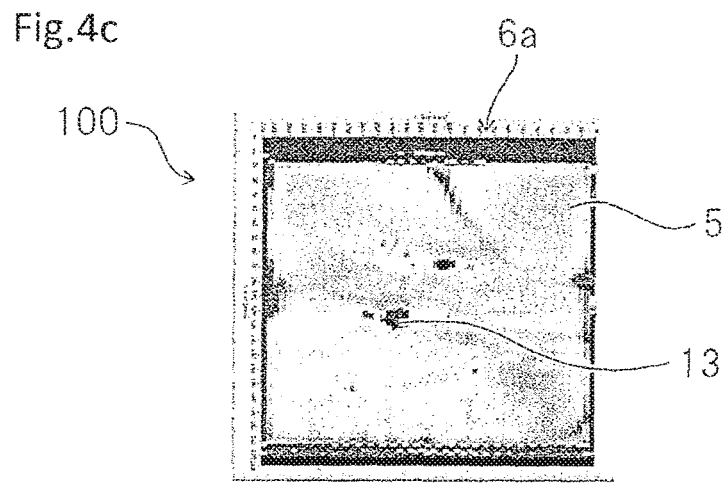
FIG. 4c is a schematic diagram showing an impregnated state after the pressurizing and maintaining step in Comparative Example 1.

In order to understand the effect of this exemplary embodiment, the impregnation rate based on this exemplary embodiment is compared with the impregnation rates based on other methods. As Comparative Example 1, when electrolyte 5 was injected without changing the pressure from the atmospheric pressure environment as shown in FIG. 4a, the impregnated state shown in FIG. 4b was obtained. At this time, only about 39.3% of entire electrode laminated body 4 was impregnated with electrolyte 5. When electrode laminated body 4 was physically pressurized to promote the infiltration of electrolyte 5, about 98.0% of entire electrode laminated body 4 was impregnated with electrolyte 5 as shown in FIG. 4c. However, for this reason, a pressurizing and maintaining time of about 36 hours, which was twice the pressurizing and maintaining step of the first exemplary embodiment, was required.

Figure 5A:
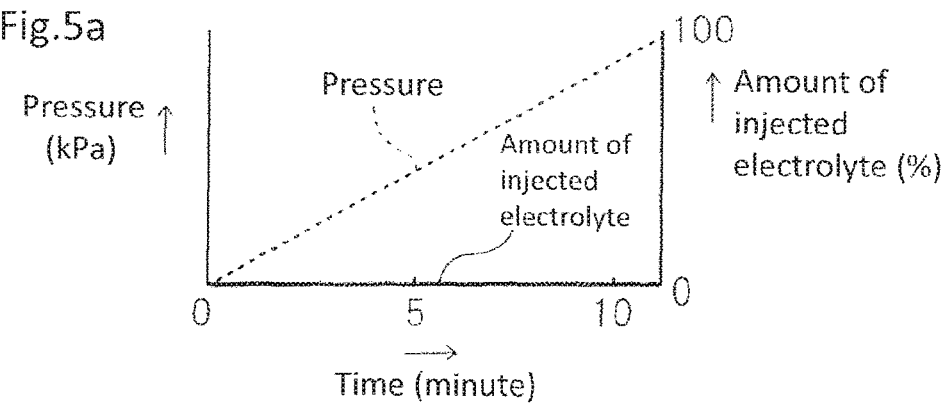
FIG. 5a is a graph showing the relationship between the environmental pressure and the amount of the injected electrolyte in Comparative Example 2.
Figure 5B:
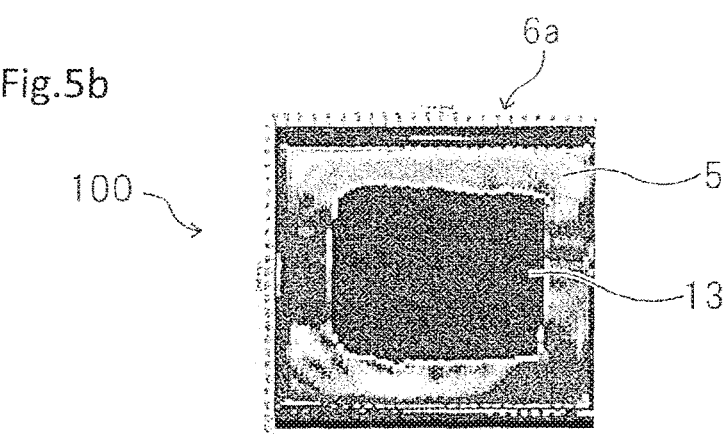
FIG. 5b is a schematic diagram showing an impregnated state at the time point when the injection of the electrolyte is completed in Comparative Example 2.
Figure 5C:
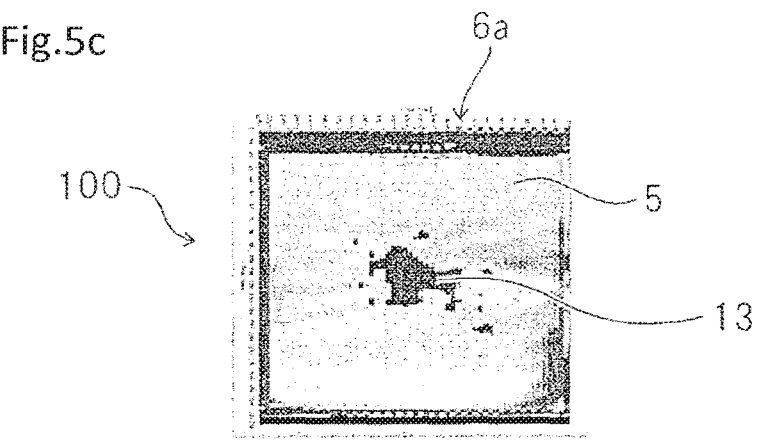
FIG. 5c is a schematic diagram showing an impregnated state after the pressurizing and maintaining step in Comparative Example 2.

As Comparative Example 2, when electrolyte 5 was injected in a vacuum environment without changing the pressure as shown in FIG. 5a, about 54.6% of entire electrode laminated body 4 was impregnated with electrolyte 5 as shown in FIG. 5b. Then, when electrode laminated body 4 was physically pressurized to promote infiltration of electrolyte 5, approximately 93.4% of entire electrode laminated body 4 was impregnated with electrolyte 5 as shown in FIG. 5c. When the same experiment was repeated a plurality of times, the impregnation rate results after the pressurizing and maintaining step were 93.4%, 91.0%, 92.0%, 91.6%.

Figure 6A:
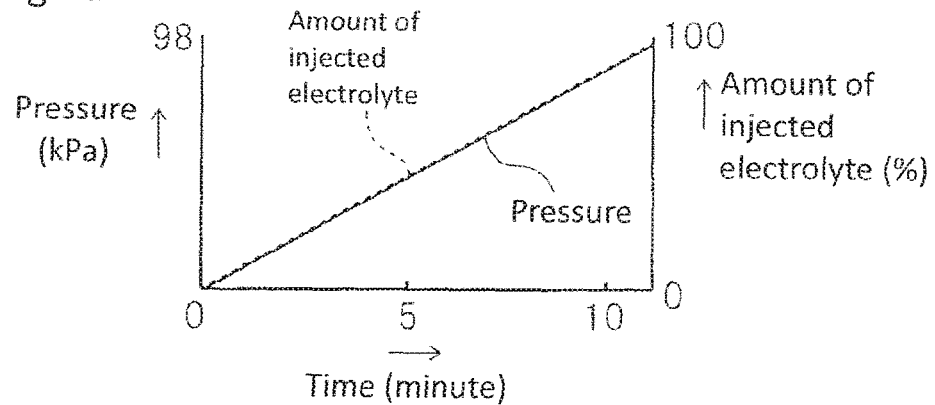
FIG. 6a is a graph showing the relationship between the environmental pressure and the amount of the injected electrolyte in Comparative Example 3.
Figure 6B:
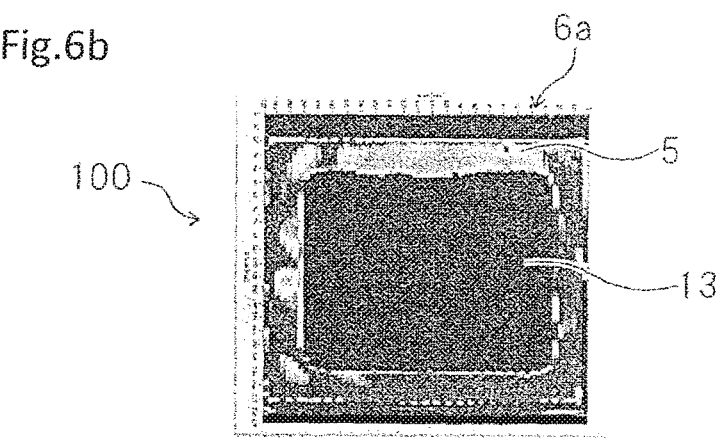
FIG. 6b is a schematic diagram showing an impregnated state at the time point when the injection of the electrolyte is completed in Comparative Example 3.
Figure 6C:
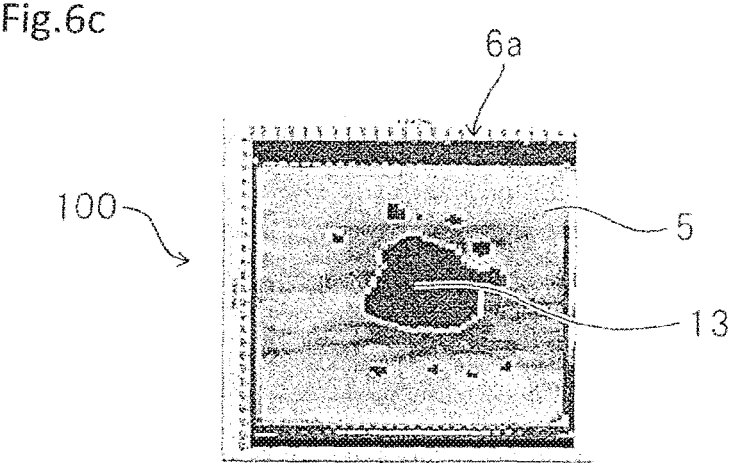
FIG. 6c is a schematic diagram showing an impregnated state after the pressurizing and maintaining step in Comparative Example 3.

As Comparative Example 3, when injection of electrolyte 5 was started in a vacuum environment and electrolyte 5 was injected while the pressure was gradually increased as shown in FIG. 6a, only about 39.1% of entire electrode laminated body 4 was impregnated with electrolyte 5 as shown in FIG. 6b. Then, when electrode laminated body 4 was physically pressurized to promote infiltration of electrolyte 5, approximately 87.4% of entire electrode laminated body 4 was impregnated with electrolyte 5 as shown in FIG. 6c. When the same experiment was repeated several times, the impregnation rate results after the pressurizing and maintaining step were 87.4%, 87.5%, 88.5%, and 91.9%.

Figure 7A:
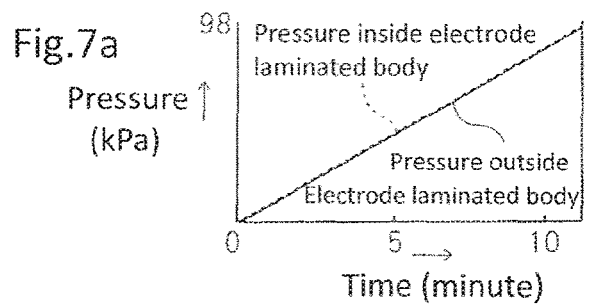
FIG. 7a is a graph showing variations of the pressure inside an electrode laminated body and the pressure outside the electrode laminated body in Comparative Example 3.
Figure 7B:
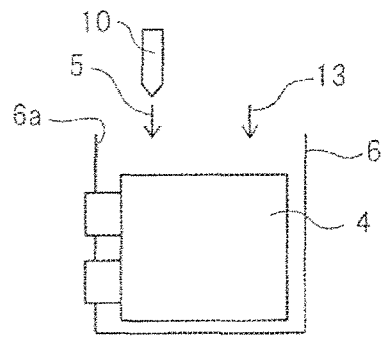
FIG. 7b is a diagram that schematically shows the states of electrolyte and air in Comparative Example 3 in turn.
Figure 7C:
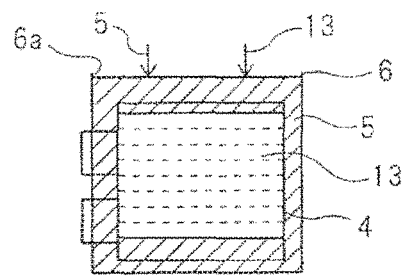
FIG. 7c is a diagram that schematically shows the states of electrolyte and air in Comparative Example 3 in turn.
Figure 7D:
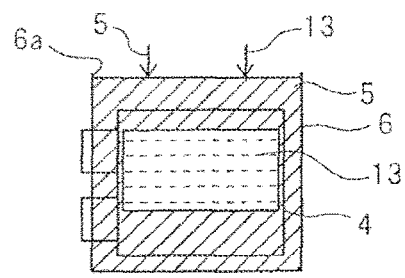
FIG. 7d is a diagram that schematically shows the states of electrolyte and air in Comparative Example 3 in turn.
Figure 7E:
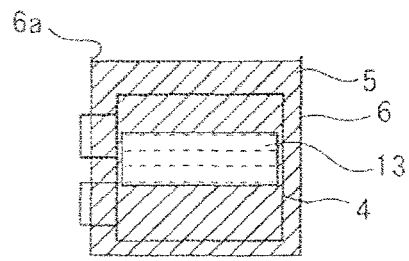
FIG. 7e is a diagram that schematically shows the states of electrolyte and air in Comparative Example 3 in turn.

As described above, as compared with Comparative Examples 1 to 3, according to this exemplary embodiment, the impregnation of electrolyte 5 in electrode laminated body 4 is favorable even at the time point when the injection of electrolyte 5 is completed and also even after electrode laminated body 4 has been physically pressurized and maintained. Therefore, it is possible to impregnate electrode laminated body 4 with a sufficient amount of electrolyte 5 to realize desired battery characteristics. The reason for the foregoing will be considered. When injection of electrolyte 5 from the electrolyte injecting device 10 is started in the vacuum environment and then electrolyte 5 is injected while the pressure is gradually increased, as in the case of Comparative Example 3, as schematically shown in FIGS. 7b to 7e, due to the increase of the pressure, electrolyte 5 infiltrates into electrode laminated body 4, and at the same time, air 13 also infiltrates into electrode laminated body 4. That is, electrolyte 5 and air 13 simultaneously infiltrate into electrode laminated body 4. Therefore, since little pressure difference occurs between the inside and the outside of electrode laminated body 4 as shown in FIG. 7a, a portion in which electrolyte 5 has not infiltrated occurs in electrode laminated body 4 corresponding to the amount of air 13 that has infiltrated into electrode laminated body 4. Even when the injection of electrolyte 5 is continued, a part of air 13 is not discharged and thus remains, so that the impregnation rate of electrolyte 5 does not become so high.

Figure 8A:
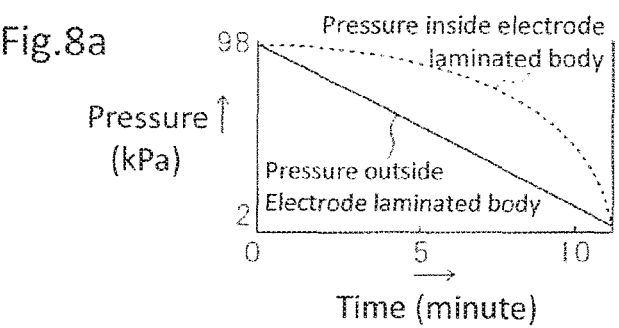
FIG. 8a is a graph showing variations of the pressure inside the electrode laminated body and the pressure outside the electrode laminated body in the first exemplary embodiment of the present invention.
Figure 8B:
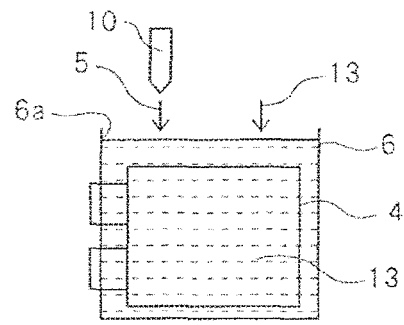
FIG. 8b is a diagram that schematically shows the states of electrolyte and air in the first exemplary embodiment of the present invention in turn.
Figure 8C:
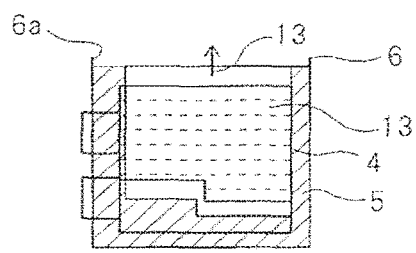
FIG. 8c is a diagram that schematically shows the states of electrolyte and air in the first exemplary embodiment of the present invention in turn.
Figure 8D:
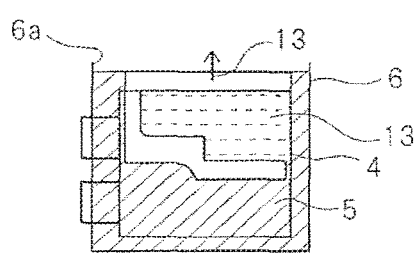
FIG. 8d is a diagram that schematically shows the states of electrolyte and air in the first exemplary embodiment of the present invention in turn.
Figure 8E:
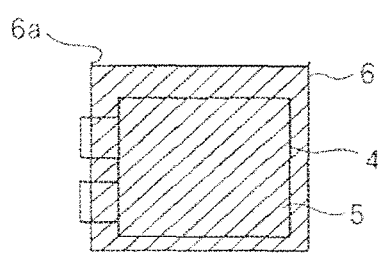
FIG. 8e is a diagram that schematically shows the states of electrolyte and air in the first exemplary embodiment of the present invention in turn.

In contrast, in the present invention, as shown in FIG. 8a, the pressures inside and outside electrode laminated body 4 are substantially the same at the start time point of injection of electrolyte 5. As the pressure is gradually reduced, the pressure drops outside electrode laminated body 4, but a sudden pressure drop is unlikely to occur inside electrode laminated body 4 because of a relatively complicated internal structure (laminated structure). That is, the pressure drops in proportion to the time outside electrode laminated body 4 whereas the pressure gently drops inside electrode laminated body 4. This means that a pressure difference occurs between the inside and the outside of electrode laminated body 4. Accordingly, as shown in FIGS. 8b to 8d, air 13 accumulated in electrode laminated body 4 is forced to flow from the inside of electrode laminated body 4 that has a relatively high pressure to the outside of electrode laminated body 4 that has a relatively low pressure. On the other hand, electrolyte 5 continues to be injected from injection port 6a into the inside of electrode laminated body 4. Therefore, gas (air 13) and liquid (electrolyte 5) are replaced with each other between the inside and the outside of electrode laminated body 4, and infiltration of electrolyte 5 and the flow-out of air 13 are performed inside electrode laminated body 4, so that electrolyte 5 is efficiently impregnated into electrode laminated body 4. For the foregoing reason, according to this exemplary embodiment, a sufficient amount of electrolyte can be injected very efficiently as shown in FIG. 8e.

[Modification]

Figure 9A:
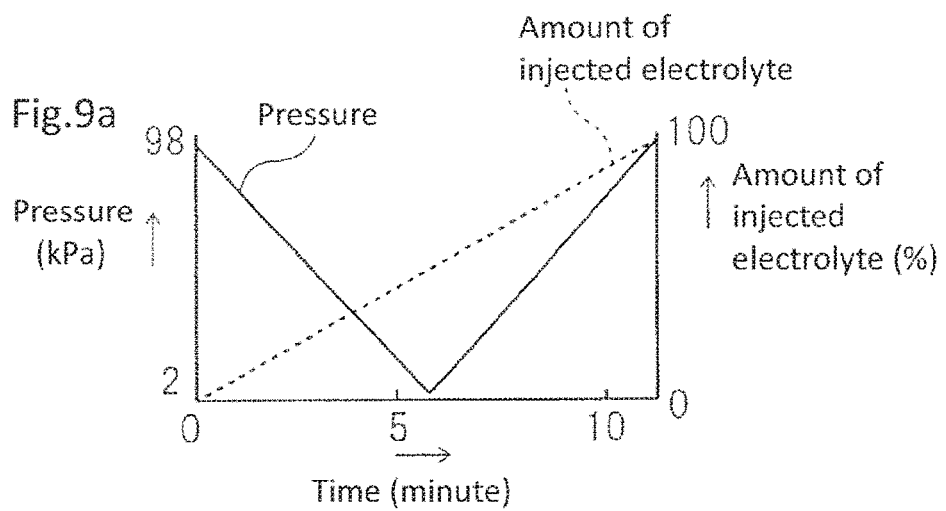
FIG. 9a is a graph showing the relationship between the environmental pressure and the amount of injected electrolyte in a modification of the first exemplary embodiment of the present invention.
Figure 9B:
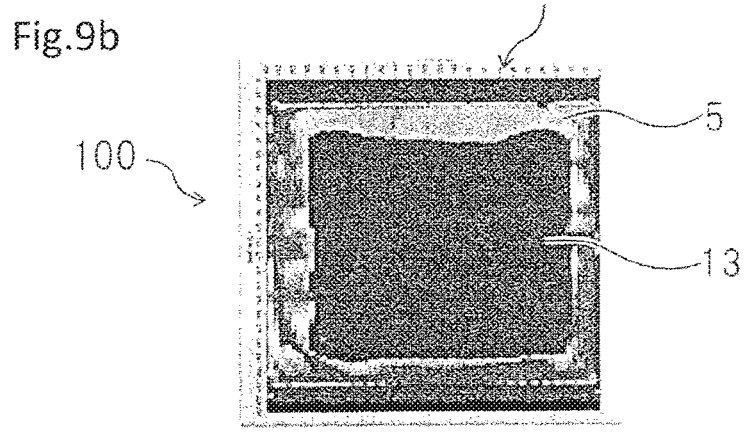
FIG. 9b is a schematic diagram showing an impregnated state at the time point when the injection of the electrolyte is completed in the modification of the first exemplary embodiment of the present invention.
Figure 9C:
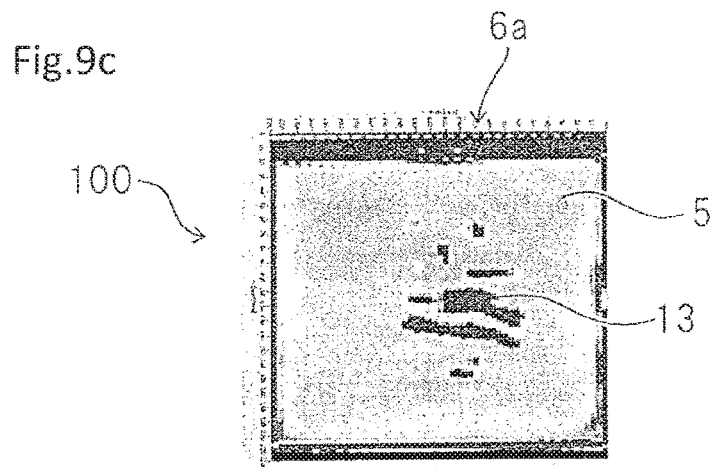
FIG. 9c is a schematic diagram showing an impregnated state after the pressurizing and maintaining step in the modification of the first exemplary embodiment of the present invention.

FIGS. 9a to 9c show a modification of this exemplary embodiment. In this modification, only the step of injecting electrolyte 5 is different from that of the foregoing examples. Since the steps other than the step of injecting electrolyte 5 and the configuration of the apparatus are the same as those in the above-described exemplary embodiment, description thereof will be omitted. In the step of injecting electrolyte 5 of this modification, since the pressure reducing speed is higher than the injection speed of electrolyte 5 as shown in FIG. 9a, the pressure inside chamber 9 (environmental pressure) reaches the pressure reduction stop pressure (2 kPa) during the injection of electrolyte 5. Thereafter, the pressure in chamber 9 is gradually returned to the atmospheric pressure, and concurrently, the injection of electrolyte 5 is continued. Finally, when the pressure in chamber 9 returns to approximately the atmospheric pressure, the injection of the predetermined amount of electrolyte 5 is completed. In this modification as well, as shown in FIG. 9b, electrolyte 5 is well impregnated into electrode laminated body 4, and as shown in FIG. 9c, the impregnation rate is further improved after the pressurizing and maintaining step.

Second Exemplary Embodiment

Figure 10:
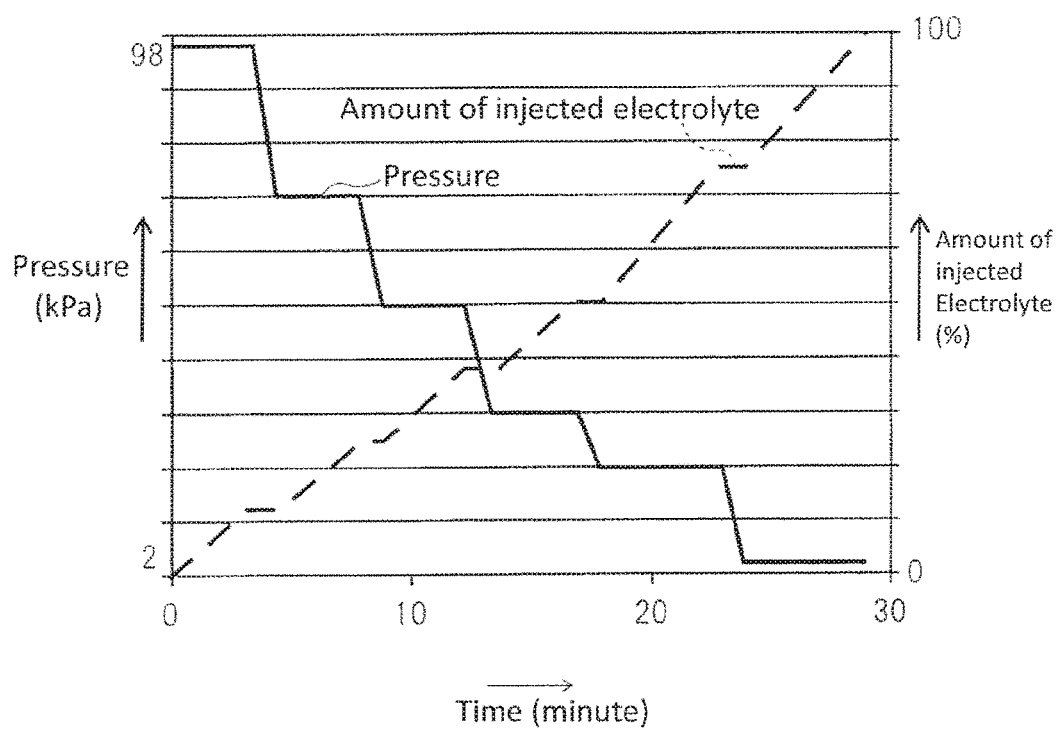
FIG. 10 is a graph showing the relationship between the environmental pressure and the amount of injected electrolyte in a secondary battery manufacturing method according to a second exemplary embodiment of the present invention.
Figure 11:
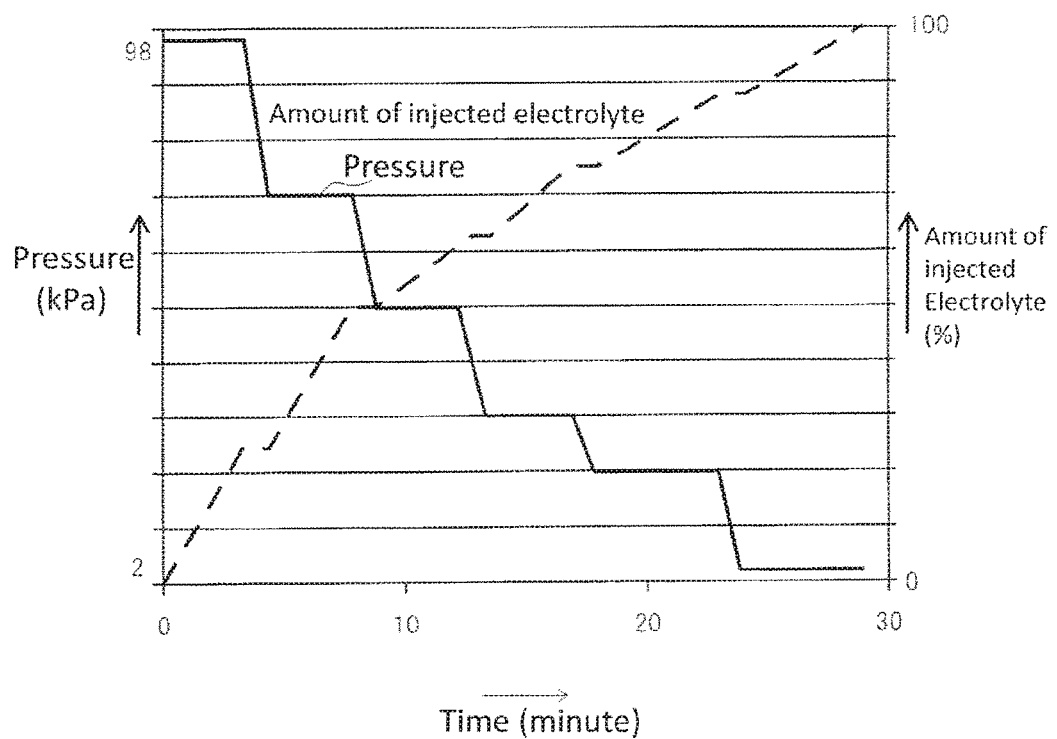
FIG. 11 is a graph showing the relationship between the environmental pressure and the amount of injected electrolyte in another example of the secondary battery manufacturing method according to the second exemplary embodiment of the present invention.
Figure 12:
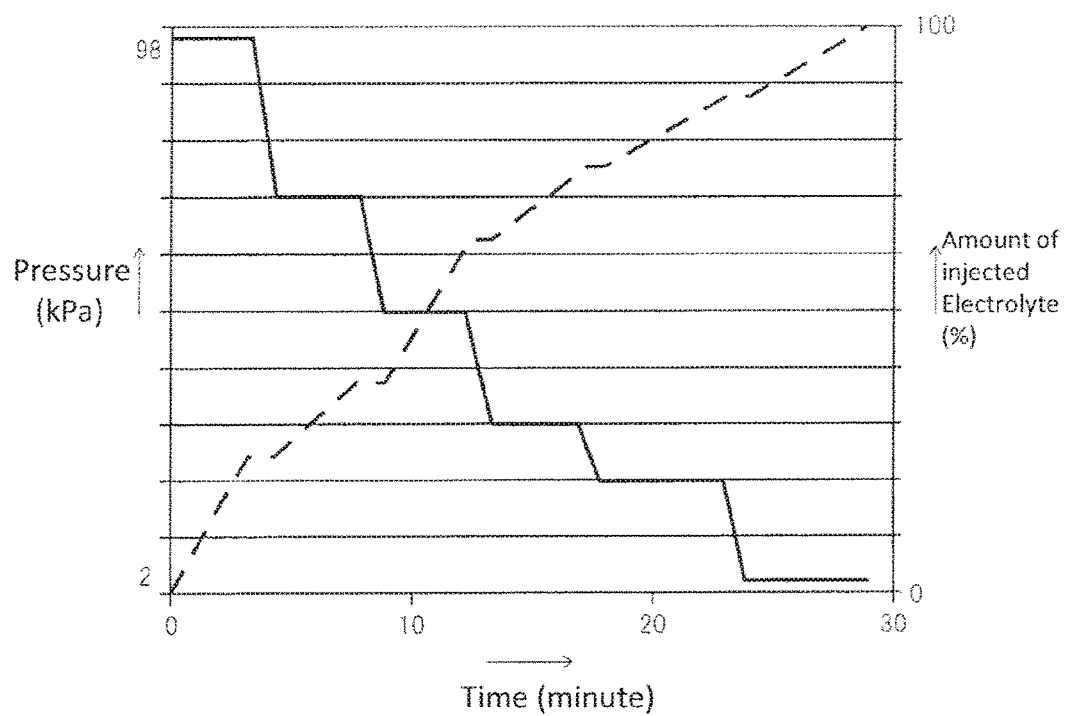
FIG. 12 is a graph showing the relationship between the environmental pressure and the amount of injected electrolyte in yet another example of the secondary battery manufacturing method according to the second exemplary embodiment of the present invention.

A second exemplary embodiment is different from the first exemplary embodiment only as regards the step of injecting electrolyte 5. Since respective steps other than the step of injecting electrolyte 5 and the configuration of the apparatus are the same as those of the first exemplary embodiment, description thereof is omitted. In the step of injecting electrolyte 5 of this exemplary embodiment, as shown in FIGS. 10 to 12, the pressure in the chamber is stepwise reduced, and the injection of electrolyte 5 is intermittently carried out so that the pressure reduction and the injection of electrolyte 5 are alternately carried out. According to the present exemplary embodiment, since the pressure reduction and the injection of electrolyte 5 are not performed at the same time, it is possible to smoothly increase the amount of injected electrolyte 5 without disturbance of the liquid surface. However, if the pressure reduction and the injection of electrolyte 5 are interrupted a little at a time, the operation time becomes long and the efficiency is lowered. Therefore, it is preferable to perform the step such that the pressure is reduced by −10 kPa or more in one pressure reduction stage, and 6% or more of a final total injection amount is injected at one liquid injection stage. The pressure reduction and the injection of electrolyte 5 are preferably carried out while each of the steps is divided into about seven stages or less.

In this exemplary embodiment, as shown in FIG. 10, the injection amount may be made small at each stage of the first half of the liquid injection step, but the injection amount may be increased at each stage of the last half. Further, as shown in FIG. 11, the injection amount may be large at each stage of the first half of the liquid injection step, but may be small at each stage of the last half. As shown in FIG. 12, the liquid injection stage with a large injection amount and the liquid injection stage with a small injection amount may be alternately carried out.

In each of the above-described exemplary embodiments, injection of electrolyte 5 into outer container 6 is started at the same time as the pressure inside chamber 9 (environmental pressure) is reduced from the atmospheric pressure. However, since there is a possibility that some time lag may occur, even in a case where the injection of electrolyte 5 is actually started while the pressure in chamber 9 slightly drops from the atmospheric pressure, for example, this case is included in the present invention. Even in that case, it is preferable to start the injection of electrolyte 5 at the time point when the environmental pressure is substantially equal to the atmospheric pressure. In the case of the first exemplary embodiment, it is preferable to start the injection of electrolyte 5 before or at the time when the pressure inside the chamber reaches pressure which is lower than atmospheric pressure by about 10 kPa. In the case of the second exemplary embodiment, it is preferable to start the injection of electrolyte 5 at the latest before pressure reduction larger than the pressure reduction in one pressure reducing stage occurs.

Although the present invention has been described with reference to the exemplary embodiments, the present invention is not limited to the above-described exemplary embodiments. Various alterations and modifications that can be understood by those skilled in the art can be made to the configuration and details of the present invention without departing from the gist of the present invention.

The present application claims priority based on Japanese Patent Application No. 2015-084219 filed on Apr. 16, 2015, the disclosure of which is incorporated herein in its entirety.

EXPLANATION OF REFERENCE NUMERALS

1 Positive electrode
2 Negative electrode
3 Separator
4 Electrode laminated body (battery element)
5 Electrolyte
6 Outer container
7 Positive electrode terminal
8 Negative electrode terminal
9 Chamber
10 Electrolyte injecting device
11 Pressure adjusting device
12 Control device
100 Secondary battery

The invention claimed is:
1. A method of manufacturing a secondary battery, the method comprising the steps of:
    inserting, into an outer container, an electrode laminated body in which a positive electrode and a negative electrode are laminated with a separator interposed therebetween;
    sealing an outer peripheral portion of the outer container except for a part thereof before or after the electrode laminated body is inserted; and injecting electrolyte into the outer container having the electrode laminated body inserted therein, from non-sealed part as an injection port, wherein in the step of injecting the electrolyte, injection of the electrolyte is started in an atmospheric pressure environment, and then the injection of the electrolyte and pressure reduction of an environmental pressure are performed, the injection of the electrolyte and the pressure reduction of the environmental pressure are intermittently performed, and the injection of the electrolyte and the pressure reduction of the environmental pressure are alternately performed, and in the step of injecting the electrolyte, a same electrolyte as the electrolyte is intermittently injected.

2. The method of manufacturing a secondary battery according to claim 1, wherein the environmental pressure is reduced to a pressure reduction stopping pressure which is higher than a vapor pressure of the electrolyte.

3. The method of manufacturing a secondary battery according to claim 2, wherein the environmental pressure is returned to an atmospheric pressure after the environmental pressure is reduced to the pressure reduction stopping pressure.

4. The method of manufacturing a secondary battery according to claim 3, wherein the injection of the electrolyte is continued at a stage where the environmental pressure is returned to the atmospheric pressure after the environmental pressure is reduced to the pressure reduction stopping pressure.

* * * * *